Figure 4:
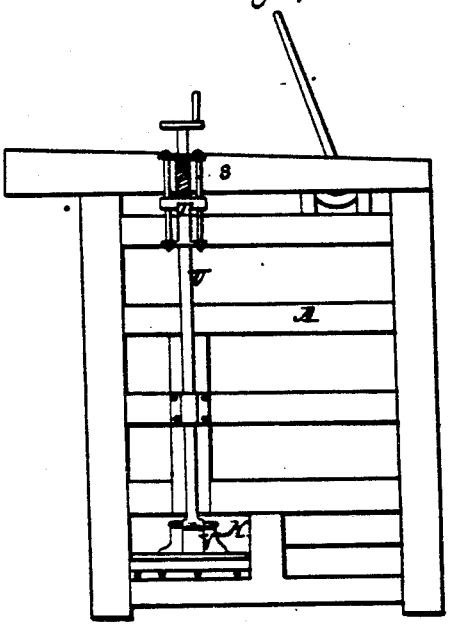

Sheet 1-2 Sheets.
D. Wilkinson.
BEST AVAILABLE COPY
Canal Lock Gate.
No 7.
A. I. Patented Apr. 24, 1838.
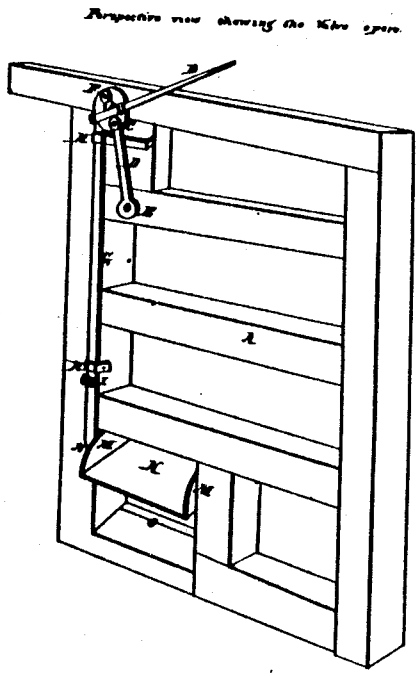
Perspective view showing the Valve gear.
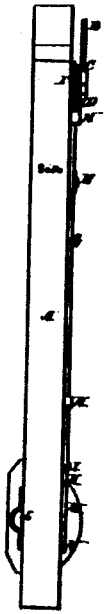
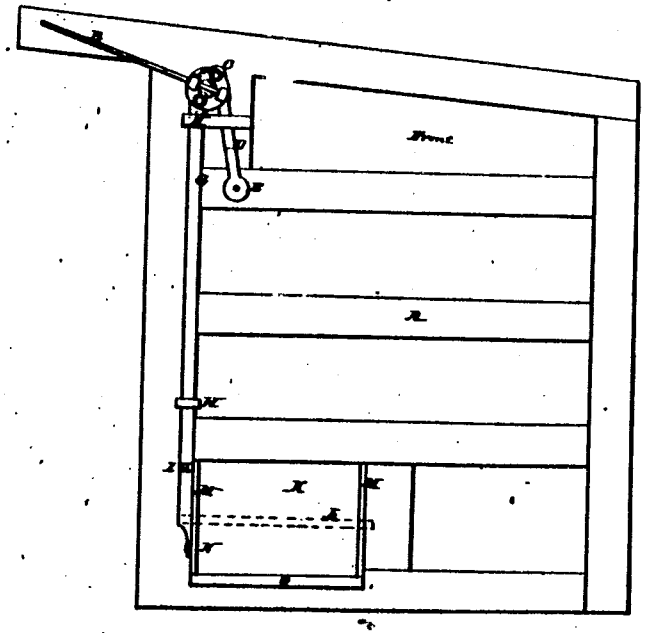
Geometrical view showing the Valve shaft.
THE GRAPHIC CO. PHOTO-LITH. 38 & 41 PARK PLACE, N.Y.

Sheet 2-2 Sheets

D. Wilkinson.

Canal Lock Gate.

BEST AVAILABLE COPY

No 7.

A.I. Patented Apr. 24, 1838.

THE GRAPHIC CO. PHOTO-LITH. 38 & 41 PARK PLACE, N.Y.